(12) United States Patent
Jung

(10) Patent No.: US 12,074,983 B2
(45) Date of Patent: Aug. 27, 2024

(54) TRUSTED COMPUTING DEVICE AND OPERATING METHOD THEREOF

(71) Applicant: SAMSUNG ELECTRONICS CO., LTD., Suwon-si (KR)

(72) Inventor: Eun Young Jung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 251 days.

(21) Appl. No.: 17/846,349

(22) Filed: Jun. 22, 2022

(65) Prior Publication Data

US 2023/0144135 A1 May 11, 2023

(30) Foreign Application Priority Data

Nov. 9, 2021 (KR) .................. 10-2021-0153229
Jan. 12, 2022 (KR) .................. 10-2022-0004434

(51) Int. Cl.
| | |
|---|---|
| *H04L 9/40* | (2022.01) |
| *G06F 11/10* | (2006.01) |
| *G06F 21/64* | (2013.01) |
| *H04L 9/08* | (2006.01) |
| *H04L 9/32* | (2006.01) |
| *H04L 12/46* | (2006.01) |
| *H04L 12/66* | (2006.01) |

(52) U.S. Cl.
CPC ........ *H04L 9/3242* (2013.01); *G06F 11/1004* (2013.01); *G06F 21/64* (2013.01); *H04L 9/0866* (2013.01)

(58) Field of Classification Search
CPC . H04L 63/0245; H04L 12/4633; H04L 12/66; H04L 63/0263; H04L 63/0254
See application file for complete search history.

(56) References Cited

U.S. PATENT DOCUMENTS

| | | | |
|---|---|---|---|
| 8,880,667 B2 | 11/2014 | Novak et al. | |
| 9,924,366 B2* | 3/2018 | Schmidt | ............... H04L 63/123 |
| 9,934,022 B2 | 4/2018 | Marr et al. | |
| 10,181,037 B2 | 1/2019 | Novak et al. | |
| 10,528,740 B2 | 1/2020 | Callaghan et al. | |
| 10,558,812 B2 | 2/2020 | Thom et al. | |
| 2008/0189549 A1* | 8/2008 | Hughes | ................. G06F 21/105 |
| | | | 713/171 |
| 2009/0196423 A1* | 8/2009 | Chandrasekaran | ......................... |
| | | | G06F 16/2358 |
| | | | 707/999.001 |

(Continued)

FOREIGN PATENT DOCUMENTS

KR    10-2016-0010600 A    1/2016

*Primary Examiner* — Darren B Schwartz
(74) *Attorney, Agent, or Firm* — Muir Patent Law, PLLC

(57) ABSTRACT

A trusted computing device and an operating method thereof are provided. Provided is a trusted computing device including, a device driven by firmware, and a master controller generating an authentication value from the firmware and checking integrity for the authentication value at a first period, wherein the master controller includes, an authentication value generator generating the authentication value, an authentication value repository storing the authentication value, a security core blocking access from the outside with respect to the authentication value stored in the authentication value repository, and an integrity checker checking integrity for the authentication value stored in the authentication value repository.

20 Claims, 9 Drawing Sheets

(56) References Cited

U.S. PATENT DOCUMENTS

| | | | |
|---|---|---|---|
| 2010/0250936 A1* | 9/2010 | Kusakawa | H04L 9/3278 |
| | | | 713/169 |
| 2011/0044451 A1* | 2/2011 | Anzai | G06F 21/51 |
| | | | 711/E12.001 |
| 2011/0099627 A1* | 4/2011 | Proudler | G06F 21/57 |
| | | | 711/E12.001 |
| 2011/0113181 A1* | 5/2011 | Piwonka | G06F 8/65 |
| | | | 711/E12.007 |
| 2012/0304281 A1* | 11/2012 | Kang | G06F 21/44 |
| | | | 726/16 |
| 2013/0159719 A1* | 6/2013 | Ha | G06F 21/51 |
| | | | 713/176 |
| 2016/0261414 A1* | 9/2016 | Lee | H04L 9/3263 |
| 2018/0089435 A1* | 3/2018 | Zander | G06F 21/577 |
| 2019/0012490 A1* | 1/2019 | Khatri | H04L 9/0643 |
| 2019/0111693 A1* | 4/2019 | Ward | B41J 2/17543 |
| 2019/0354672 A1* | 11/2019 | Cambou | H04L 9/3236 |
| 2020/0021445 A1* | 1/2020 | Caceres | G06F 21/44 |
| 2020/0313893 A1* | 10/2020 | Thom | H04L 63/14 |
| 2020/0396092 A1* | 12/2020 | Cambou | H04L 9/0869 |
| 2021/0103658 A1* | 4/2021 | Soryal | G06F 21/51 |
| 2021/0281431 A1* | 9/2021 | Swaminathan | G06F 21/73 |

\* cited by examiner

TRUSTED COMPUTING DEVICE AND OPERATING METHOD THEREOF

CROSS-REFERENCE TO RELATED APPLICATIONS

This application claims priority from Korean Patent Application No. 10-2021-0153229 filed on Nov. 9, 2021, and Korean Patent Application No. 10-2022-0004434 filed on Jan. 12, 2022, in the Korean Intellectual Property Office and all the benefits accruing therefrom under 35 U.S.C. 119, the contents of each of which in its entirety are herein incorporated by reference.

BACKGROUND

1. Field

Embodiments relate to a trusted computing device and an operating method thereof.

2. Description of the Related Art

In a computing environment that provides or includes access to the Internet, diverse hacking attacks are gradually increasing. In order to avoid such hacking attacks, constant security patches of operating systems or software are called for. Therefore, attempts to solve the above problem fundamentally have been made, and as a result, trusted computing (TC) technology has been researched and developed.

SUMMARY

An embodiment is directed to a trusted computing device including, a device driven by firmware, and a master controller generating an authentication value from the firmware and checking integrity for the authentication value at a first period, wherein the master controller includes, an authentication value generator generating the authentication value, an authentication value repository storing the authentication value, a security core blocking access from the outside with respect to the authentication value stored in the authentication value repository, and an integrity checker checking integrity for the authentication value stored in the authentication value repository.

An embodiment is directed to a trusted computing device including, a first device driven by first firmware and a second device driven by second firmware, and a master controller generating a first authentication value from the first firmware to check integrity for the first authentication value at a first period, and generating a second authentication value from the second firmware to check integrity for the second authentication value at a second period, wherein the master controller includes, an authentication value generator generating the first authentication value and the second authentication value, an authentication value repository storing the first authentication value and the second authentication value, a security core blocking access from the outside with respect to the first and second authentication values stored in the authentication value repository, and an integrity checker checking integrity for the first and second authentication values stored in the authentication value repository.

An embodiment is directed to a trusted computing device including a master controller that checks integrity for an authentication value of firmware that drives the device, wherein the master controller checks integrity for the authentication value every first period, and the master controller generates the authentication value through an authentication value generator, stores the authentication value through an authentication value repository, blocks access from the outside with respect to the authentication value stored in the authentication value repository, through a security core, and checks integrity for the authentication value stored in the authentication value repository, through an integrity checker.

BRIEF DESCRIPTION OF THE DRAWINGS

Features will become apparent to those of skill in the art by describing in detail example embodiments with reference to the attached drawings in which.

DETAILED DESCRIPTION

Figure 1:
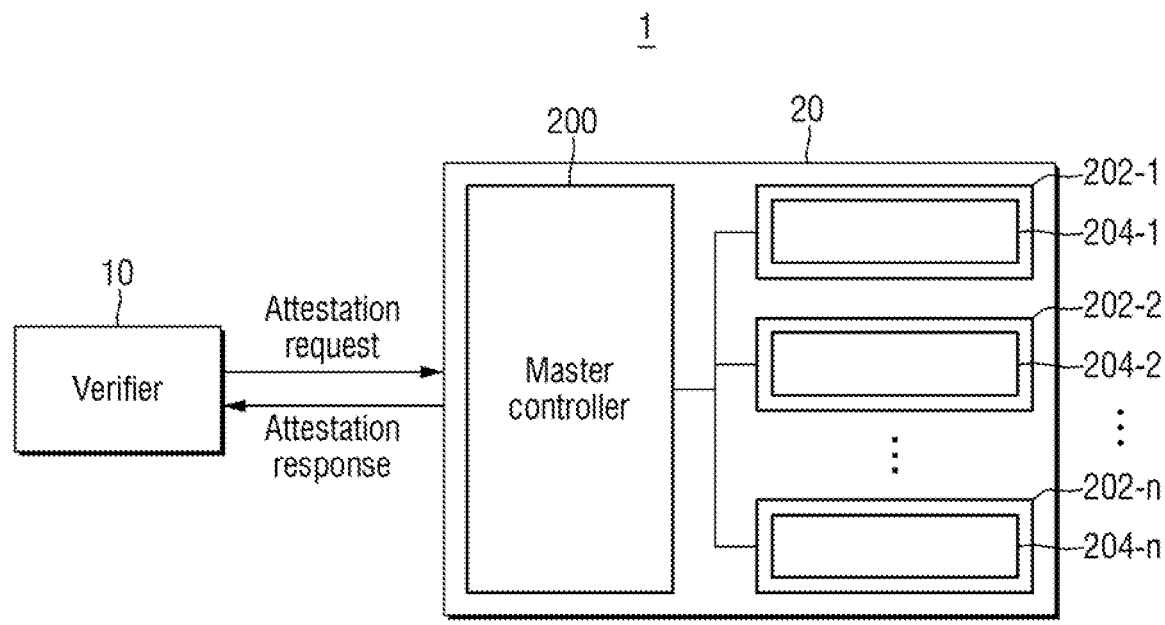
FIG. 1 is a block diagram illustrating a trusted computing system according to some example embodiments.

FIG. 1 is a block diagram illustrating a trusted computing system according to some example embodiments.

Referring to FIG. 1, a trusted computing system 1 may include a verifier 10 and a platform 20.

The verifier 10 may be a user who uses the platform 20, and may be a user who requests the platform 20 provide services. The verifier 10 may perform an operation of attesting reliability as to whether the platform 20 is reliable. The user may include an entity who uses any electronic devices such as, e.g., personal computers, cellular phones, hand-held messaging devices, laptop computers, set-top boxes, personal information terminals, or electronic book readers.

The platform 20 may include a master controller 200 and a plurality of devices 202-1 to 202-n (n is a natural number). The master controller 200 may control the overall operation of the platform 20. Also, the master controller 200 may perform communication with devices included in the platform 20. For example, the master controller 200 may transfer commands to the plurality of devices 202-1 to 202-*n*. The master controller 200 may be, e.g., a Baseboard Management Controller (BMC), a Trusted Platform Module (TPM), or a Secure Processor.

Each of the plurality of devices 202-1 to 202-*n* may be, e.g., a central processing unit (CPU), a graphic processing unit (GPU), a network interface card (NIC), or a storage device.

The storage device may include, e.g., a 2D NAND memory array or a 3D (or vertical) NAND (VNAND) memory array. As another example, the storage device may include other various types of non-volatile memories. For example, the storage device may be an electronic storage device to which a Magnetic RAM (MRAM), a Spin-Transfer Torque MRAM, a Conductive Bridging RAM (CBRAM), a Ferroelectric RAM (FeRAM), a Phase change RAM (PRAM), a Resistive RAM, or another type of memory is applied.

Each of the plurality of devices 202-1 to 202-*n* may be driven by firmware 204-1 to 204-*n*. Although the plurality of devices 202-1 to 202-*n* are shown as including firmware 204-1 to 204-*n*, respectively, this may be varied, e.g., only some of the plurality of devices 202-1 to 202-*n* may include firmware.

For example, when the first device 202-1 is a central processing unit, firmware may not be present in the first device 202-1. Assuming that the second device 202-2 is a read only memory (ROM), the first device 202-1 may execute firmware (or code or function) 204-2 programmed into the second device 202-2.

When the verifier 10 transmits an attestation request to the platform 20 to perform an operation of attesting reliability as to whether the platform 20 is reliable, the platform 20 may send an attestation response to the verifier 10 that attests reliability for the plurality of devices 202-1 to 202-*n*.

At this time, the platform 20 may transmit authentication values for the plurality of firmware 204-1 to 204-*n* together. That is, integrity for the authentication values transmitted from the platform 20 to the verifier 10 should be maintained, so that the verifier 10 may trust the attestation response.

Hereinafter, a configuration and operation of maintaining integrity for the authentication values transmitted from the platform 20 (hereinafter, collectively referred to as trusted computing device) to the verifier 10 in accordance with some embodiments will be described in detail.

Figure 2:
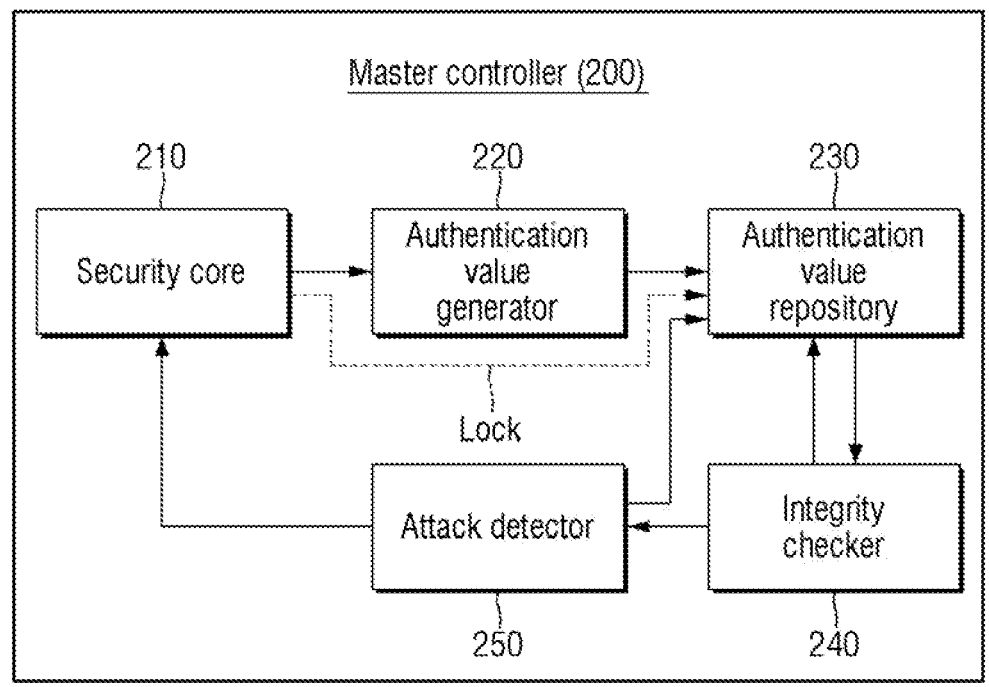
FIG. 2 is a block diagram illustrating a master controller of a trusted computing device according to some example embodiments.

FIG. 2 is a block diagram illustrating a master controller of a trusted computing device according to some example embodiments.

Referring to FIGS. 1 and 2, the master controller 200 may include a security core 210, an authentication value generator 220, an authentication value repository 230, an integrity checker 240, and an attack detector 250.

The security core 210 may receive a plurality of firmware 204-1 to 204-*n* or codes for a plurality of firmware 204-1 to 204-*n* (hereinafter, collectively referred to as codes for a plurality of firmware 204-1 to 204-*n*).

Afterwards, the authentication value generator 220 may generate a plurality of authentication values by using codes for the plurality of firmware 204-1 to 204-*n* received from the security core 210. For example, the authentication value generator 220 may generate the plurality of authentication values by applying a hash function to the codes for the plurality of firmware 204-1 to 204-*n*.

The plurality of authentication values generated through the authentication value generator 220 may be stored in the authentication value repository 230. The authentication value repository 230 may include a plurality of registers to store each of the plurality of authentication values in each register, but, e.g., the plurality of authentication values may be stored in one register.

The security core 210 may lock the plurality of authentication values when the plurality of authentication values are stored in the authentication value repository 230. For example, the security core 210 may lock the plurality of authentication values, which are stored in the authentication value repository 230, in hardware.

In more detail, the security core 210 may block access from the outside with respect to the plurality of authentication values stored in the authentication value repository 230 to block modulation for the plurality of authentication values. The access from the outside may be, e.g., the access of another core in the master controller 200, or the access of the verifier 10.

Then, the integrity checker 240 may periodically check integrity for the plurality of authentication values stored in the authentication value repository 230. The period at which the integrity checker 240 checks integrity for the plurality of authentication values may be in real time. The period at which the integrity checker 240 checks integrity for the plurality of authentication values may be a period at which the verifier 10 transmits an attestation request to the platform 20.

The periods at which the integrity checker 240 checks integrity for each of the plurality of authentication values may be different from each other. For example, the integrity checker 240 may check integrity for a first authentication value at a first period, and may check integrity for a second authentication value at a second period. Alternatively, the periods at which the integrity checker 240 checks integrity for each of the plurality of authentication values may be the same as each other. For example, when the integrity checker 240 checks integrity for the first authentication value at the first period and checks integrity for the second authentication value at the second period, the first period and the second period may be the same as each other.

The period at which the integrity checker 240 checks integrity for each of a plurality of authentication values may be controlled only by the security core 210.

As a result of checking integrity for the plurality of authentication values, when the integrity checker 240 determines that integrity is maintained, the integrity checker 240 may continue to check integrity.

On the other hand, as a result of checking integrity for the plurality of authentication values, when the integrity checker 240 determines that integrity is not maintained, the integrity checker 240 may transmit a signal, which indicates that integrity for the authentication value is not maintained, to the attack detector 250.

The attack detector 250, having received a signal indicating that integrity is not maintained, may reset the authentication value for which integrity is not maintained. For example, when the authentication value for which integrity is not maintained is 0x2456781285, the attack detector 250 may reset the authentication value to 00000000. In addition, the attack detector 250 may inform the security core 210 that integrity for the authentication value is not maintained.

The operation of the attack detector 250 that resets the authentication value for which integrity is not maintained and the operation of informing the security core 210 that integrity for the authentication value is not maintained may be performed in parallel, or may be performed with an order.

Figure 3:
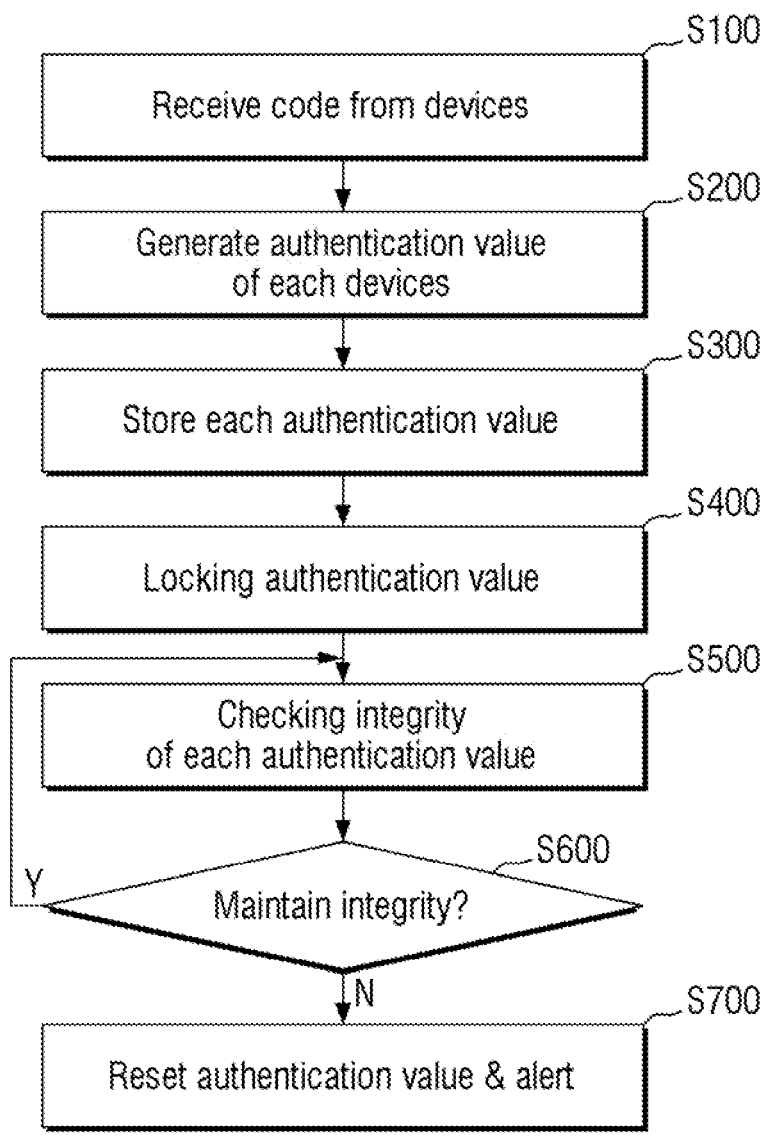
FIG. 3 is a flow chart illustrating a method of operating a master controller of a trusted computing device according to some example embodiments.
Figure 4:
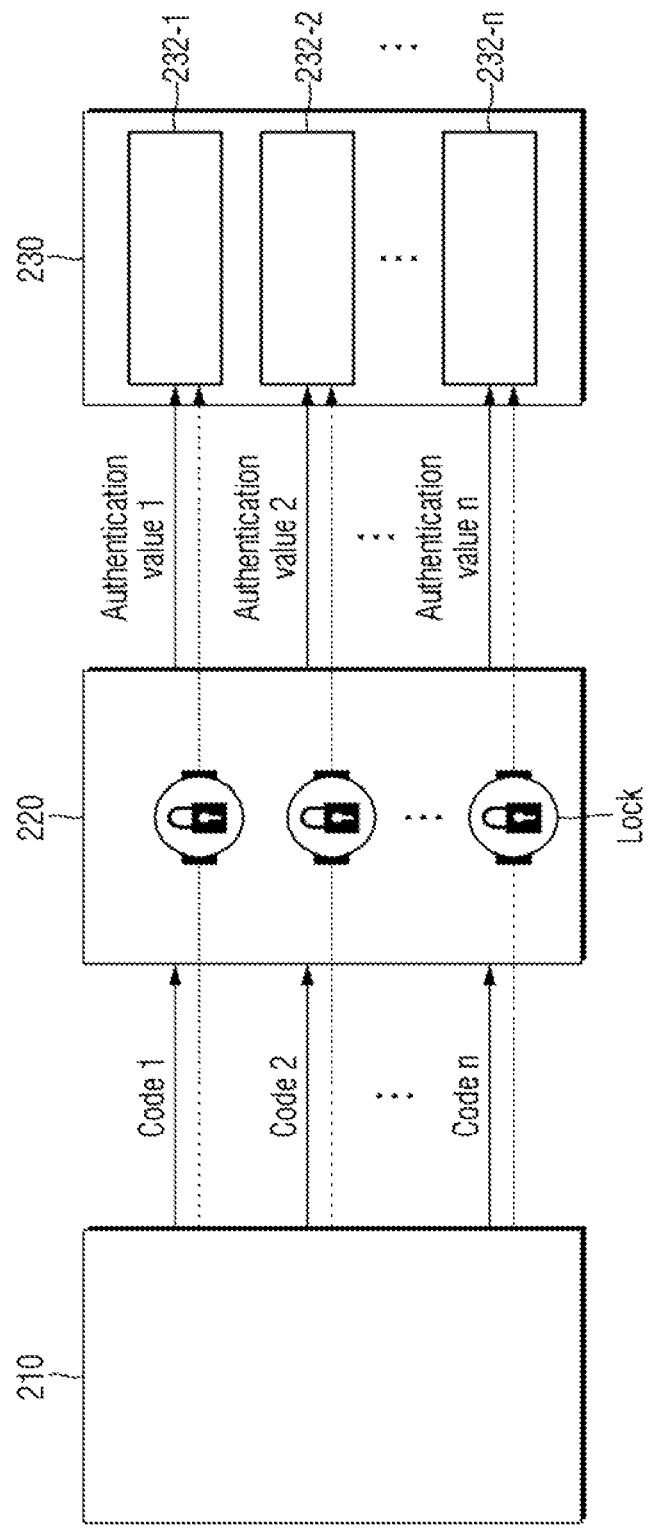
FIGS. 4 and 5 are block diagrams illustrating an operation of a master controller of a trusted computing device according to some example embodiments.
Figure 5:
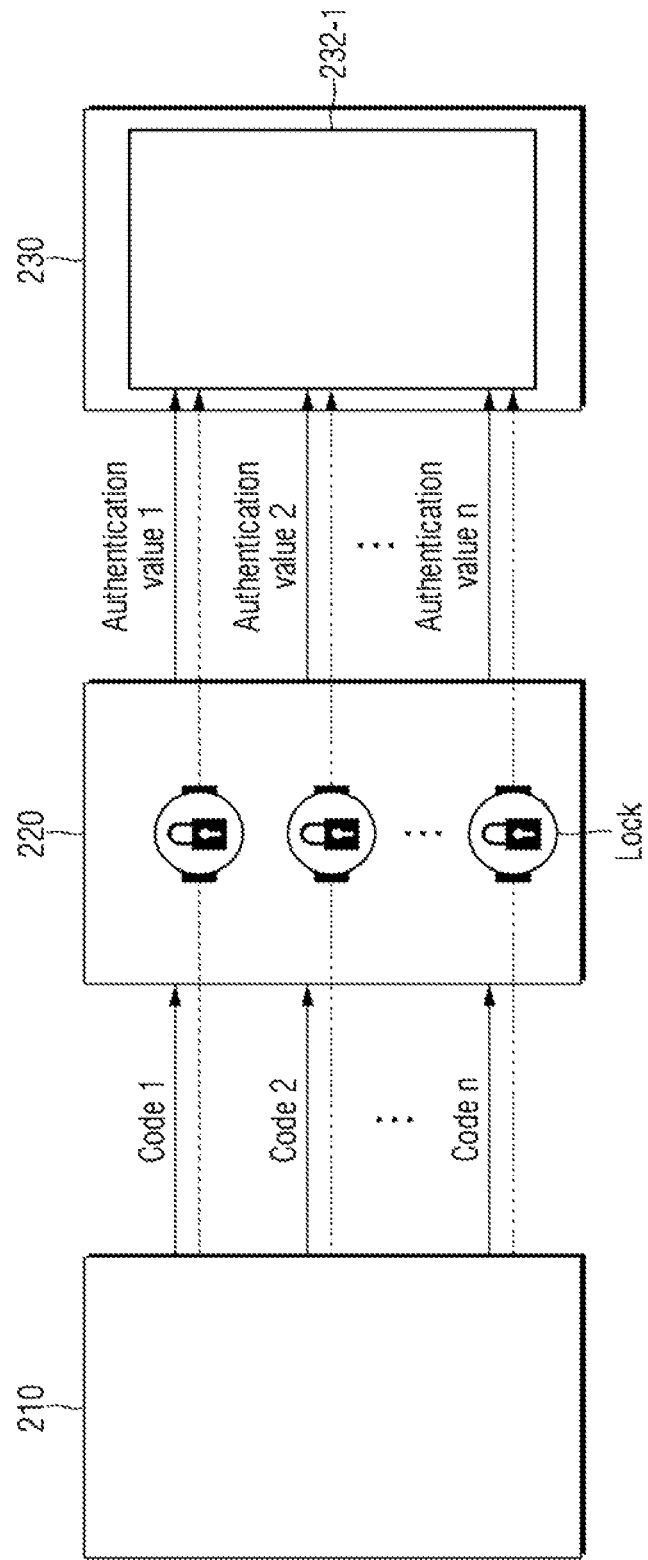

FIG. 3 is a flow chart illustrating a method of operating a master controller of a trusted computing device according to some example embodiments. FIGS. 4 and 5 are block diagrams illustrating an operation of a master controller of a trusted computing device according to some example embodiments.

Referring to FIGS. 1 to 5, the security core 210 may receive a plurality of firmware 204-1 to 204-n or codes for the plurality of firmware 204-1 to 204-n (S100).

Then, the authentication value generator 220 may generate a plurality of authentication values Authentication value 1 to Authentication value n by using codes Code 1 to Code n for the plurality of firmware 204-1 to 204-n received from the security core 210 (S200). For example, the authentication value generator 220 may generate a plurality of authentication values Authentication value 1 to Authentication value n by applying a hash function to the codes Code 1 to Code n for the plurality of firmware 204-1 to 204-n.

The plurality of authentication values Authentication value 1 to Authentication value n generated by the authentication value generator 220 may be stored in the authentication value repository 230 (S300). The authentication value repository 230 may include a plurality of registers 232-1 to 232-n to store each of the plurality of authentication values in each register. For example, the first authentication value Authentication value 1 may be stored in the first register 232-1, the second authentication value Authentication value 2 may be stored in the second register 232-2, and the (n)th authentication value Authentication value n may be stored in the (n)th register 232-n.

In another implementation, the plurality of authentication values Authentication value 1 to Authentication value n may be stored in one register 232-1. For example, as shown in FIG. 5, the plurality of authentication values Authentication value 1 to Authentication value n may be stored in one register 232-1.

The security core 210 may lock the plurality of authentication values Authentication value 1 to Authentication value n when the plurality of authentication values Authentication value 1 to Authentication value n are stored in the authentication value repository 230. For example, the security core 210 may lock the plurality of authentication values stored in the authentication value repository 230, in hardware.

In more detail, the security core 210 may block access from the outside with respect to the plurality of authentication values Authentication value 1 to Authentication value n stored in the authentication value repository 230 to block modulation for the plurality of authentication values Authentication value 1 to Authentication value n. The access from the outside may be, e.g., the access of another core in the master controller 200, or the access of the verifier 10.

Then, the integrity checker 240 may periodically check integrity for the plurality of authentication values Authentication value 1 to Authentication value n stored in the authentication value repository 230 (S500). The period at which the integrity checker 240 checks integrity for the plurality of authentication values Authentication value 1 to Authentication value n may be in real time. The period at which the integrity checker 240 checks integrity for the plurality of authentication values Authentication value 1 to Authentication value n may be a period at which the verifier 10 transmits an attestation request to the platform 20.

The periods at which the integrity checker 240 checks integrity for each of the plurality of authentication values Authentication value 1 to Authentication value n may be different from each other. For example, the integrity checker 240 may check integrity for the first authentication value Authentication value 1 at a first period, and may check integrity for the second authentication value Authentication value 2 at a second period. Alternatively, the periods at which the integrity checker 240 checks integrity for each of the plurality of authentication values Authentication value 1 to Authentication value n may be the same as each other. For example, when the integrity checker 240 checks integrity for the first authentication value Authentication value 1 at the first period and checks integrity for the second authentication value Authentication value 2 at the second period, the first period and the second period may be the same as each other.

The period at which the integrity checker 240 checks integrity for each of the plurality of authentication values Authentication value 1 to Authentication value n may be controlled only by the security core 210.

As a result of checking integrity for the plurality of authentication values Authentication value 1 to Authentication value n (S600), when the integrity checker 240 determines that integrity is maintained (Y), the integrity checker 240 may continue to check integrity (S500).

On the other hand, as a result of checking integrity for the plurality of authentication values Authentication value 1 to Authentication value n, when the integrity checker 240 determines that integrity is not maintained (N), the integrity checker 240 may transmit a signal, which indicates that integrity for the authentication value is not maintained, to the attack detector 250.

The attack detector 250 that has received a signal indicating that integrity is not maintained may reset the authentication value for which integrity is not maintained. For example, when the authentication value for which integrity is not maintained is 0x2456781285, the attack detector 250 may reset the authentication value to 00000000. In addition, the attack detector 250 may inform the security core 210 that integrity for the authentication value is not maintained (S700).

The operation of the attack detector 250 that resets the authentication value for which integrity is not maintained and the operation of informing the security core 210 that integrity for the authentication value is not maintained may be performed in parallel, or may be performed with an order.

Figure 6:
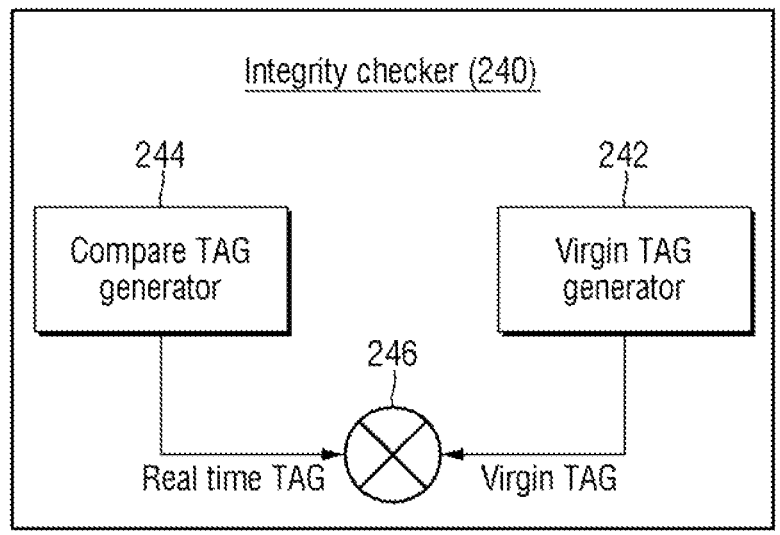
FIG. 6 is a block diagram illustrating an integrity checker in a master controller of a trusted computing device according to some example embodiments.

FIG. 6 is a block diagram illustrating an integrity checker in a master controller of a trusted computing device according to some example embodiments.

Referring to FIGS. 2, 4 and 6, the integrity checker 240 includes a virgin tag generator 242 and a compare tag generator 244.

The virgin tag generator 242 may generate a virgin tag Virgin TAG for each of authentication values Authentication value 1 to Authentication value n stored in the authentication value repository 230 when the authentication value generator 220 generates the authentication values Authentication value 1 to Authentication value n and the generated authentication values Authentication value 1 to Authentication value n are stored in the authentication value repository 230. For example, the virgin tag generator 242 may generate a first virgin tag Virgin TAG 1 for the first authentication value Authentication value 1 and may generate a second virgin tag Virgin TAG 2 for the second authentication value Authentication value 2.

The virgin tag generator 242 may generate a virgin tag Virgin TAG through HMAC, a hash function, cyclic redundancy checking (CRC), or a parity bit.

The compare tag generator 244 may generate a Real time TAG for the authentication values Authentication value 1 to Authentication value n every period at which the integrity checker 240 checks integrity for the authentication values Authentication value 1 to Authentication value n. For example, the compare tag generator 244 may generate a first real time tag Real time TAG 1 for the first authentication value Authentication value 1 and may generate a second real time tag Real time TAG 2 for the second authentication value Authentication value 2.

The compare tag generator 244 may generate a Real time TAG through HMAC, a hash function, cyclic redundancy checking (CRC), or a parity bit.

At this time, the Virgin TAG generated by the virgin tag generator 242 and the Real time TAG generated by the compare tag generator 244 may be generated in the same manner. For example, when the virgin tag generator 242 generates a Virgin TAG through the CRC, the compare tag generator 244 may also generate a Real time TAG through the CRC.

Afterwards, the comparator 246 may compare the Real time TAG with the Virgin TAG every period at which the integrity checker 240 checks integrity for the authentication values Authentication value 1 to Authentication value n. For example, the comparator 246 may compare the first real time tag Real time TAG 1 with the first virgin tag Virgin TAG 1. In addition, e.g., the comparator 246 may compare the second real time tag Real time TAG 2 with the second virgin tag Virgin TAG 2.

When it is determined that the Real time TAG and the Virgin TAG are the same as each other, it may be determined that integrity for the authentication values Authentication value 1 to Authentication value N stored in the authentication value repository 230 is maintained. For example, when it is determined that the first real time tag Real time TAG 1 and the first virgin tag Virgin TAG 1 are the same as each other, it may be determined that integrity for the first authentication value Authentication value 1 is maintained. In addition, e.g., when it is determined that the second real time tag Real time TAG 2 and the second virgin tag Virgin TAG 2 are the same as each other, it may be determined that integrity for the second authentication value authentication value 2 is maintained.

The real time TAG may continue to be generated.

When it is determined that the Real time TAG and the Virgin TAG are not the same as each other, it may be determined that integrity for the authentication values Authentication value 1 to Authentication value n stored in the authentication value repository 230 is not maintained. For example, when it is determined that the first real time tag Real time TAG 1 and the first virgin tag Virgin TAG 1 are not the same as each other, it may be determined that integrity for the first authentication value Authentication value 1 is not maintained. In addition, e.g., when it is determined that the second real time tag Real time TAG 2 and the second virgin tag Virgin TAG 2 are not the same as each other, it may be determined that integrity for the second authentication value Authentication value 2 is not maintained.

At this time, the integrity checker 240 may send a signal indicating that integrity for all or some of the authentication values Authentication value 1 to Authentication value n stored in the authentication value repository 230 is not maintained to the attack detector 250. Then, the attack detector 250 that has received the signal indicating that integrity is not maintained may reset the authentication value for which integrity is not maintained. For example, when the authentication value for which integrity is not maintained is 0x2456781285, the attack detector 250 may reset the authentication value to 00000000. In addition, the attack detector 250 may inform the security core 210 that integrity for the authentication value is not maintained.

Figure 7:
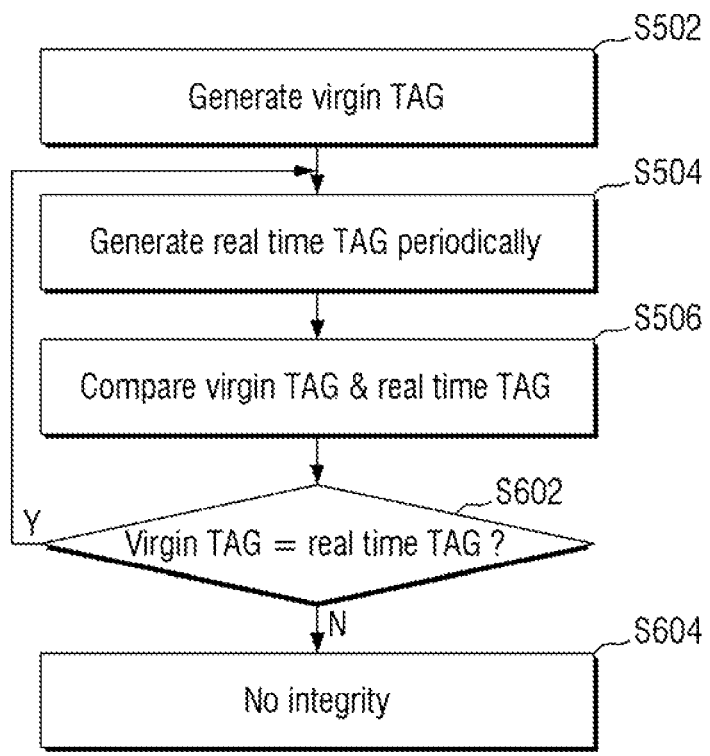
FIG. 7 is a flow chart illustrating an operation of an integrity checker in a master controller of a trusted computing device according to some example embodiments.

FIG. 7 is a flow chart illustrating an operation of an integrity checker in a master controller of a trusted computing device according to some example embodiments.

Referring to FIGS. 2, 4, 6 and 7, the virgin tag generator 242 may generates a virgin tag Virgin TAG for each of authentication values Authentication value 1 to Authentication value n stored in the authentication value repository 230 when the authentication value generator 220 generates the authentication values Authentication value 1 to Authentication value n and the generated authentication values Authentication value 1 to Authentication value n are stored in the authentication value repository 230 (S502). For example, the virgin tag generator 242 may generate a first virgin tag Virgin TAG 1 for the first authentication value Authentication value 1, and may generate a second virgin tag Virgin TAG 2 for the second authentication value Authentication value 2.

The virgin tag generator 242 may generate a virgin tag Virgin TAG through HMAC, a hash function, cyclic redundancy checking (CRC), or a parity bit.

The compare tag generator 244 may generate a Real time TAG for the authentication values Authentication value 1 to Authentication value n every period at which the integrity checker 240 checks integrity for the authentication values Authentication value 1 to Authentication value n (S504). For example, the compare tag generator 244 may generate a first real time tag Real time TAG 1 for the first authentication value Authentication value 1, and may generate a second real time tag Real time TAG 2 for the second authentication value Authentication value 2.

The compare tag generator 244 may generate a Real time TAG through HMAC, a hash function, cyclic redundancy checking (CRC), or a parity bit.

At this time, the Virgin TAG generated by the virgin tag generator 242 and the Real time TAG generated by the compare tag generator 244 may be generated in the same manner. For example, when the virgin tag generator 242 generates a Virgin TAG through the CRC, the compare tag generator 244 may also generate a Real time TAG through the CRC.

Afterwards, the comparator 246 may compare the Real time TAG with the Virgin TAG every period at which the integrity checker 240 checks integrity for the authentication values Authentication value 1 to Authentication value n (S506). For example, the comparator 246 may compare the first real time tag Real time TAG 1 with the first virgin tag Virgin TAG 1. In addition, e.g., the comparator 246 may compare the second real time tag Real time TAG 2 with the second virgin tag Virgin TAG 2.

At this time, the result of comparison between the real time tag Real time TAG and the virgin tag Virgin TAG may be checked (S602). When it is determined that the Real time TAG and the Virgin TAG are the same as each other (Y), it may be determined that integrity for the authentication values Authentication value 1 to Authentication value N stored in the authentication value repository 230 is maintained. For example, when it is determined that the first real time tag Real time TAG 1 and the first virgin tag Virgin TAG 1 are the same as each other, it may be determined that integrity for the first authentication value Authentication value 1 is maintained. In addition, e.g., when it is determined that the second real time tag Real time TAG 2 and the second virgin tag Virgin TAG 2 are the same as each other, it may be determined that integrity for the second authentication value authentication value 2 is maintained.

The real time TAG may continue to be generated (S504).

As a result of comparison between the real time tag Real time TAG and the virgin tag Virgin TAG (S602), when it is determined that the Real time TAG and the Virgin TAG are not the same as each other (N), it may be determined that integrity for the authentication values Authentication value 1 to Authentication value n stored in the authentication value repository 230 is not maintained. For example, when it is determined that the first real time tag Real time TAG 1 and the first virgin tag Virgin TAG 1 are not the same as each other, it may be determined that integrity for the first authentication value Authentication value 1 is not maintained. In addition, e.g., when it is determined that the second real time tag Real time TAG 2 and the second virgin tag Virgin TAG 2 are not the same as each other, it may be determined that integrity for the second authentication value Authentication value 2 is not maintained.

At this time, the integrity checker 240 may send a signal indicating that integrity for all or some of the authentication values Authentication value 1 to Authentication value n stored in the authentication value repository 230 is not maintained to the attack detector 250. Then, the attack detector 250, having received the signal indicating that integrity is not maintained, may reset the authentication value for which integrity is not maintained. For example, when the authentication value for which integrity is not maintained is 0x2456781285, the attack detector 250 may reset the authentication value to 00000000. In addition, the attack detector 250 may inform the security core 210 that integrity for the authentication value is not maintained.

Figure 8:
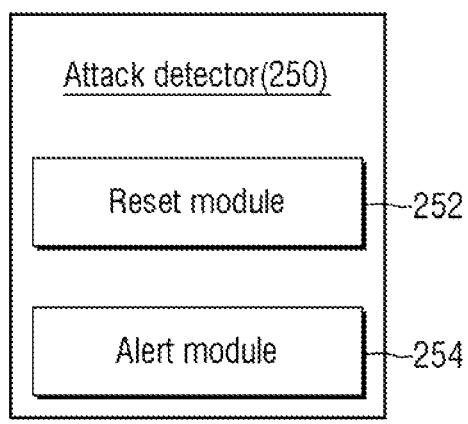
FIG. 8 is a block diagram illustrating an attack detector in a master controller of a trusted computing device according to some example embodiments.

FIG. 8 is a block diagram illustrating an attack detector in a master controller of a trusted computing device according to some example embodiments.

Referring to FIG. 8, the attack detector 250 may include a reset module 252 and an alert module 254.

The reset module 252 of the attack detector 250, having received a signal indicating that integrity is not maintained from the integrity checker 240, may reset the authentication value for which integrity is not maintained. For example, when the authentication value for which integrity is not maintained is 0x2456781285, the reset module 252 may reset the authentication value to 00000000.

Also, the alert module 254 may inform the security core 210 that integrity for the authentication value is not maintained.

The operation of the reset module 252 that resets the authentication value for which integrity is not maintained and the operation of the alert module 254 that informs the security core 210 that integrity for the authentication value has not been maintained may be performed in parallel, or may be performed with an order.

Figure 9:
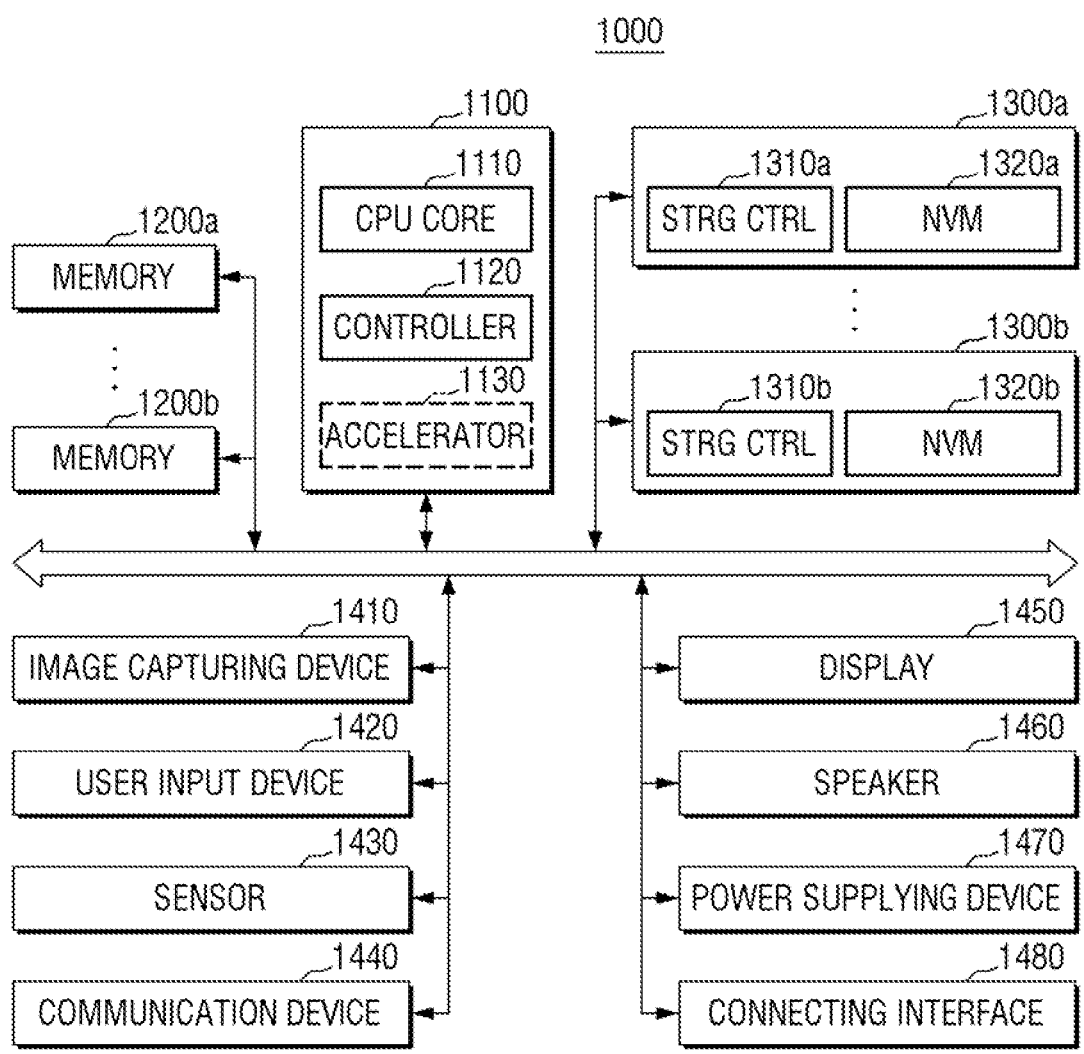
FIG. 9 is an example diagram illustrating a system to which a trusted computing device according to some example embodiments is applied.

FIG. 9 is an example diagram illustrating a system to which a trusted computing device according to some example embodiments is applied.

FIG. 9 illustrates a system 1000 to which a trusted computing device according to an example embodiment is applied. The system 1000 of FIG. 9 may be a mobile system such as a mobile phone, a smart phone, a tablet personal computer (PC), a wearable device, a healthcare device, or an Internet of things (JOT) device, a personal computer, a laptop computer, a server, a media player, or an automotive device such as navigator.

Referring to FIG. 9, the system 1000 may include a main processor 1100, memories 1200a and 1200b, storage devices 1300a and 1300b, and one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, e.g., the operation of other elements constituting the system 1000. The main processor 1100 may be implemented as a general purpose processor, a dedicated processor, or an application processor.

The main processor 1100 may include one or more CPU cores 1110, and may further include a controller 1120 for controlling the memories 1200a and 1200b and/or the storage devices 1300a and 1300b. In accordance with an example embodiment, the main processor 1100 may further include an accelerator 1130 that is a dedicated circuit for high-speed data computation such as an artificial intelligence (AI) data computation. The accelerator 1130 may include a graphics processing unit (GPU), a neural network processing unit (NPU), and/or a data processing unit (DPU), and may be implemented as a separate chip physically independent from other elements of the main processor 1100.

The memories 1200a and 1200b may be used as main memory devices of the system 1000, and may include a volatile memory such as SRAM and/or DRAM but may also include a non-volatile memory such as a flash memory, a PRAM, and/or an RRAM. The memories 1200a and 1200b may be implemented in the same package as the main processor 1100.

The storage devices 1300a and 1300b may serve as non-volatile storage devices for storing data regardless of whether power is supplied, and may have a storage capacity relatively greater than that of the memories 1200a and 1200b. The storage devices 1300a and 1300b may include storage controllers 1310a and 1310b and non-volatile memories (NVM) 1320a and 1320b for storing data under the control of the storage controllers 1310a and 1310b. The non-volatile memories 1320a and 1320b may include a flash memory of a two-dimensional (2D) structure or a three-dimensional (3D) Vertical NAND (V-NAND) structure, but may also include other types of non-volatile memories such as a PRAM and/or an RRAM.

The storage devices 1300a and 1300b may be included in the system 1000 in a physically separated state from the main processor 1100, and may be implemented in the same package as the main processor 1100. In addition, the storage devices 1300a and 1300b may be detachably coupled to other elements of the system 1000 through an interface, such as a connecting interface 1480, which will be described later, by having the same form as that of a solid state device (SSD) or a memory card. Such storage devices 1300a and 1300b may be devices to which standard protocols such as Universal Flash Storage (UFS), Embedded Multi-Media Card (eMMC), or Non-Volatile Memory Express (NVMe) are applied.

Although not shown, the storage devices 1300a and 1300b may include a master controller 200 described with reference to FIGS. 1 to 8.

The image capturing device 1410 may capture a still image or a video, and may be a camera, a camcorder, and/or a webcam.

The user input device 1420 may receive various types of data input from a user of the system 1000, and may be a touch pad, a keypad, a keyboard, a mouse, and/or a microphone.

The sensor 1430 may sense various types of physical quantities that may be acquired from the outside of the system 1000 and convert the sensed physical quantities into an electrical signal. The sensor 1430 may be a temperature sensor, a pressure sensor, an illuminance sensor, a position sensor, an acceleration sensor, a biosensor, and/or a gyroscope sensor.

The communication device 1440 may perform transmission and reception of signals between other devices outside the system 1000 in accordance with various communication protocols. Such a communication device 1440 may be implemented by including an antenna, a transceiver, and/or a modem.

The display 1450 and the speaker 1460 may serve as output devices that output visual information and auditory information to a user of the system 1000, respectively.

The power supplying device 1470 may appropriately convert power supplied from an external power source and/or a battery (not shown) embedded in the system 1000 to supply the power to each element of the system 1000.

The connecting interface 1480 may provide connection between the system 1000 and an external device connected to the system 1000 to exchange data with the system 1000. The connecting interface 1480 may be implemented in a variety of interface ways such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), Secure Digital (SD) card, Multi-Media Card (MMC), eMMC, UFS, embedded Universal Flash Storage (eUFS), and Compact Flash (CF) card interface.

Figure 10:
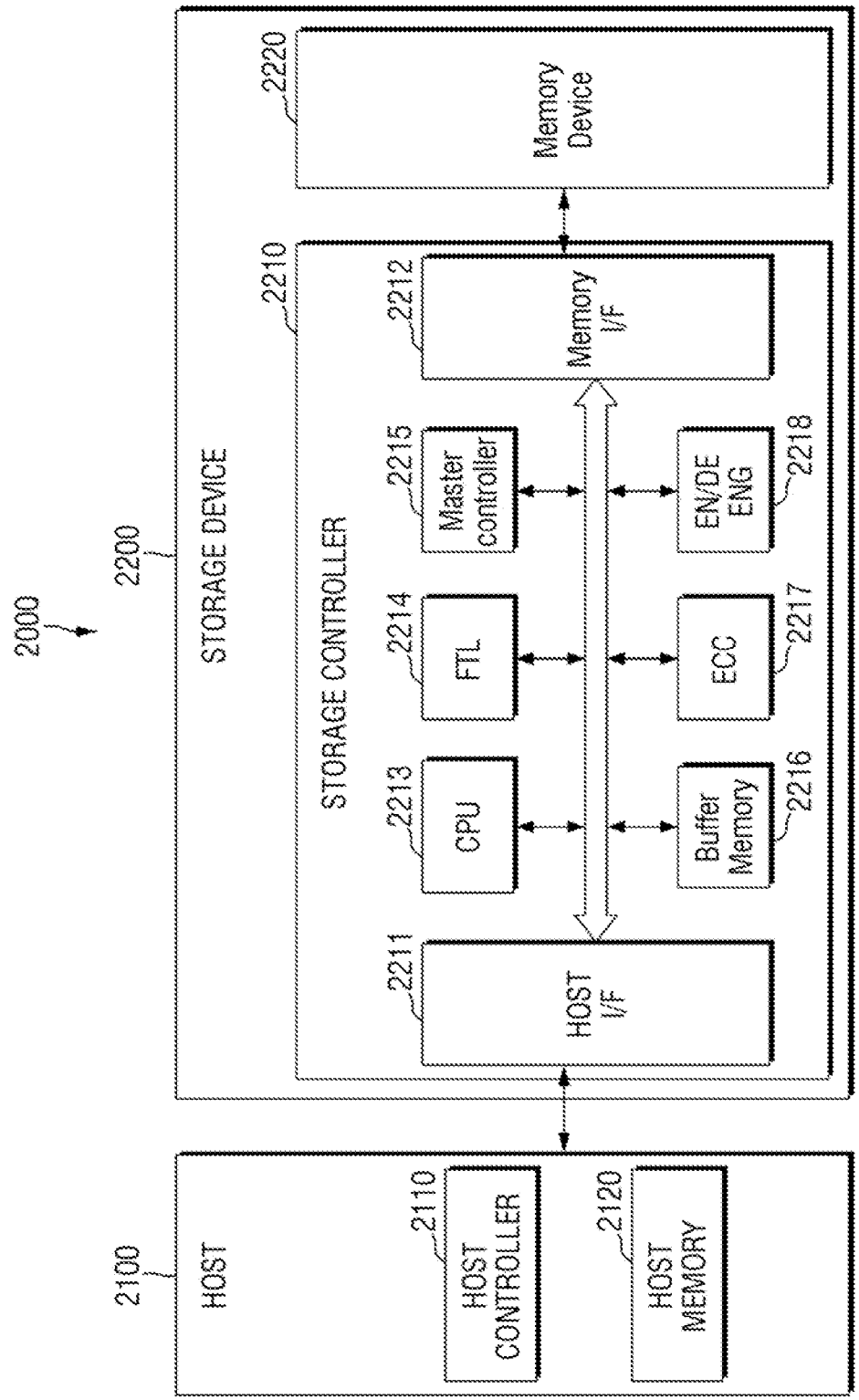
FIG. 10 is an example diagram illustrating a storage system to which a trusted computing device according to some example embodiments is applied.

FIG. 10 is an example diagram illustrating a storage system to which a trusted computing device according to some example embodiments is applied.

FIG. 10 is a block diagram illustrating a host-storage system 2000 to which a trusted computing device according to an example embodiment is applied.

The host-storage system 2000 may include a host 2100 and a storage device 2200. The host 2100 may be the verifier 10 described above with reference to FIGS. 1 to 8. In addition, the storage device 2200 may be the trusted computing device 20 described above with reference to FIGS. 1 to 8.

The storage device 2200 may include a storage controller 2210 and a non-volatile memory (NVM) 2220. In addition, in accordance with an example embodiment, the host 2100 may include a host controller 2110 and a host memory 2120. The host memory 2120 may serve as a buffer memory for temporarily storing data to be transmitted to the storage device 2200, or data transmitted from the storage device 2200.

The storage device 2200 may also include storage media for storing data in accordance with a request from the host 2100. As an example, the storage device 2200 may include at least one of a solid state drive (SSD), an embedded memory, or a detachable external memory. When the storage device 2200 is the SSD, the storage device 2200 may be a device that complies with a non-volatile memory express (NVMe) standard. When the storage device 2200 is the embedded memory or the external memory, the storage device 2200 may be a device that complies with a universal flash storage (UFS) standard or an embedded multi-media card (eMMC) standard. Each of the host device 100 and the storage device 2200 may generate and transmit packets according to a standard protocol that is employed.

When the non-volatile memory 2220 of the storage device 2200 includes a flash memory, the flash memory may include a 2D NAND memory array or a 3D (or vertical) NAND (VNAND) memory array. As another example, the storage device 2200 may include other various types of non-volatile memories. For example, a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories may be applied to the storage device 2200.

In accordance with an example embodiment, each of the host controller 2110 and the host memory 2120 may be implemented as a separate semiconductor chip. Alternatively, in some example embodiments, the host controller 2110 and the host memory 2120 may be integrated into the same semiconductor chip. As an example, the host controller 2110 may be any of a plurality of modules provided in an application processor, and the application processor may be implemented as a system on chip (SoC). In addition, the host memory 2120 may be an embedded memory provided in the application processor, or may be a non-volatile memory or memory module disposed outside the application processor.

The host controller 2110 may store data (e.g., write data) of a buffer region of the host memory 2120 in the non-volatile memory 2220, or may manage an operation of storing data (e.g., read data) of the non-volatile memory 2220 in the buffer region.

The storage controller 2210 may include a host interface 2211, a memory interface 2212 and a central processing unit (CPU) 2213. The storage controller 2210 may further include a flash translation layer (FTL) 2214, a master controller 2215, a buffer memory 2216, an error correction code (ECC) engine 2217 and an encryption/decryption engine 2218. The storage controller 2210 may further include a working memory (not shown) in which a flash translation layer FTL 2214 is loaded, and the CPU 2213 may control data write and read operations for the non-volatile memory 2220 by executing the flash translation layer 2214.

The host interface 2211 may transmit and receive packets to and from the host 2100. The packets transmitted from the host 2100 to the host interface 2211 may include a command or data to be written in the non-volatile memory 2220, and the packets transmitted from the host interface 2211 to the host 2100 may include a response to the command or data read from the non-volatile memory 2220. The memory interface 2212 may transmit the data to be written in the non-volatile memory 2220 to the non-volatile memory 2220 or may receive the data read from the non-volatile memory 2220. Such a memory interface 2212 may be implemented to comply with standard protocols such as Toggle or Open NAND Flash Interface (ONFI).

The flash translation layer 2214 may perform various functions such as address mapping, wear-leveling, and garbage collection. The address mapping operation is an operation of changing a logical address received from the host 2100 to a physical address used to actually store data in the non-volatile memory 2220. The wear-leveling is a technique for preventing excessive degradation of a specific block by allowing blocks in the non-volatile memory 2220 to be used uniformly, and may exemplarily be implemented through firmware technology for balancing erase counts of physical blocks. The garbage collection is a technique for making sure of the available capacity in the non-volatile memory 2220 by copying valid data of a block to a new block and then erasing the existing block.

The master controller 2215 may be the master controller described with reference to FIGS. 1 to 8.

The buffer memory 2216 may be provided in the storage controller 2210, but may be disposed outside the storage controller 2210.

The ECC engine 2217 may perform error detection and correction functions for the read data read from the non-volatile memory 2220. In more detail, the ECC engine 2217 may generate parity bits for write data to be written in the non-volatile memory 2220, and the generated parity bits may be stored in the non-volatile memory 2220 together with the write data. When reading the data from the non-volatile memory 2220, the ECC engine 217 may correct an error of the read data by using the parity bits read from the non-volatile memory 2220 together with the read data, and then may output the error-corrected read data.

The encryption/decryption engine 2218 may perform at least one of an encryption operation or a decryption operation for the data input to the storage controller 2210.

For example, the encryption/decryption engine 2218 may perform the encryption operation and/or the decryption operation by using a symmetric-key algorithm. In this case, the encryption/decryption engine 2218 may perform the encryption operation and/or the decryption operation by using, e.g., an Advanced Encryption Algorithm (AES) algorithm or a Data Encryption Standard (DES) algorithm.

Also, e.g., the encryption/decryption engine 2218 may perform the encryption operation and/or the decryption operation by using a public key encryption algorithm. At this time, the encryption/decryption engine 2218 may perform encryption by using a public key during the encryption operation, and may perform decryption by using a secret key during the decryption operation. For example, the encryption/decryption engine 2218 may utilize a Rivest Shamir Adleman (RSA) algorithm, an Elliptic Curve Cryptography (ECC) algorithm, or a Diffie-Hellman (DH) encryption algorithm.

The encryption/decryption engine 218 may perform the encryption operation and/or the decryption operations by using quantum cryptography techniques such as homomorphic encryption (HE), post-quantum cryptography (PQC), or functional encryption (FE).

Figure 11:
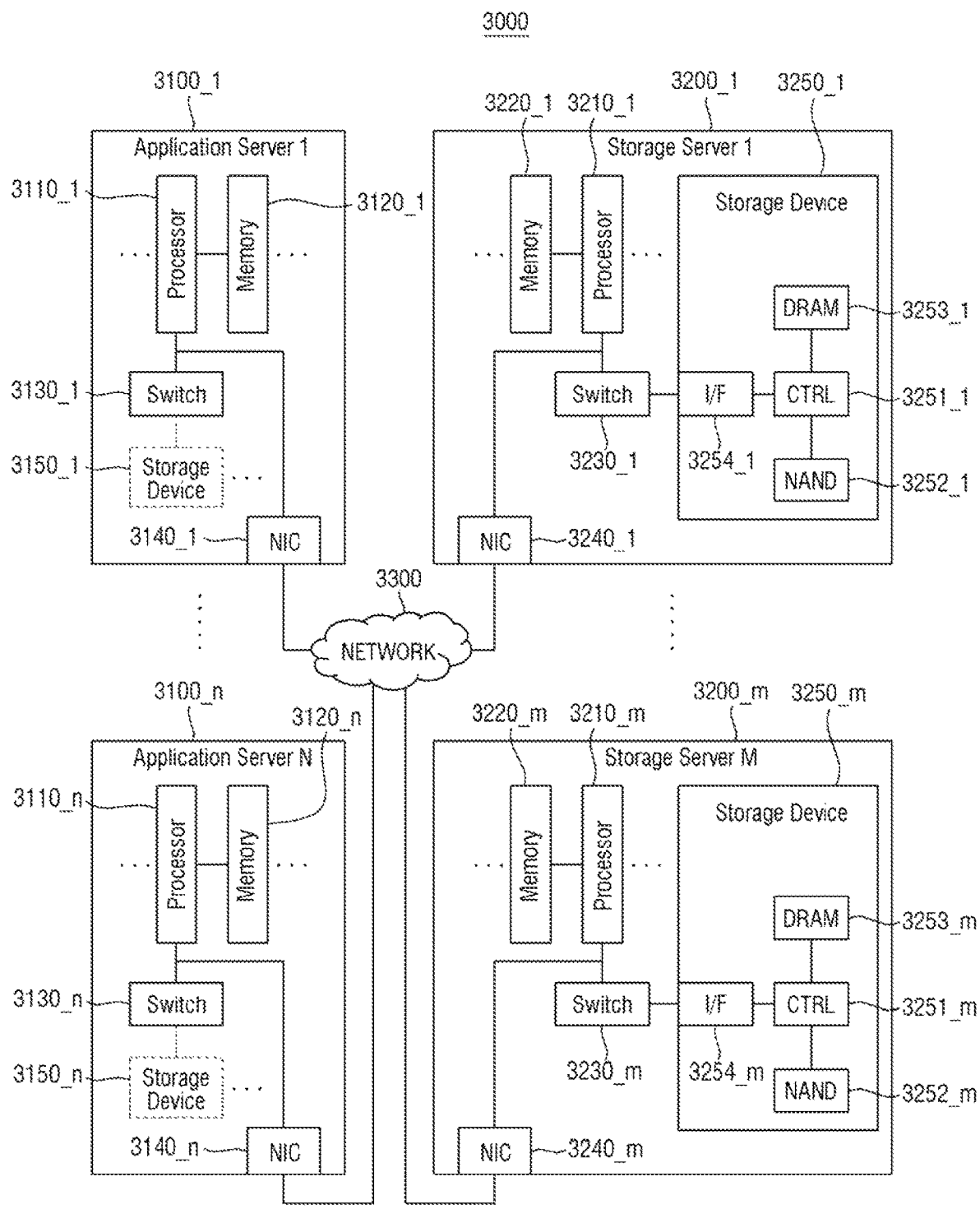
FIG. 11 is an example diagram illustrating a data center to which a trusted computing device according to some example embodiments is applied.

FIG. 11 is an example diagram illustrating a data center to which a trusted computing device according to some example embodiments is applied.

Referring to FIG. 11, a data center 3000 is a facility for providing a service by collecting various data, and may be referred to as a data storage center. The data center 3000 may be a system for a search engine or a database operation, and may be a computing system used in an enterprise such as a bank or a government agency. The data center 3000 may include application servers 3100_1 to 3100_n and storage servers 3200_1 to 3200_m. The number of application servers 3100_1 to 3100_n and the number of storage servers 3200_1 to 3200_m may be variously selected in accordance with example embodiments, and the number of application servers 3100_1 to 3100_n and the number of storage servers 3200_1 to 3200_m may be different from each other.

The application server 3100 or the storage server 3200 may include at least one of the processors 3110 and 3210 or the memories 3120 and 3220. The storage server 3200 will be described by way of example. The processor 3210 may control the overall operation of the storage server 3200, and may access the memory 3220 to execute command languages and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or a Non-Volatile DIMM (NVMDIMM). In accordance with an example embodiment, the number of processors 3210 and the number of memories 3220, which are included in the storage server 3200, may be variously selected. In an example embodiment, the processor 3210 and the memory 3220 may provide a processor-memory pair. In an example embodiment, the number of processors 3210 and the number of memories 3220 may be different from each other. The processor 3210 may include a single core processor or a multi-core processor. The description of the storage server 3200 may be similarly applied to the application server 3100. In accordance with an example embodiment, the application server 3100 may not include the storage device 3150. The storage server 3200 may include at least one storage device 3250. The number of storage devices 3250 included in the storage server 3200 may be variously selected in accordance with example embodiments.

The application servers 3100_1 to 3100_n and the storage servers 3200_1 to 3200_m may perform communication with each other through a network 3300. The network 3300 may be implemented using a Fibre Channel (FC) or Ethernet. In this case, the FC is a medium used for relatively high-speed data transmission, and may use an optical switch that provides high performance/high availability. In accordance with an access scheme of the network 3300, the storage servers 3200_1 to 3200_m may be provided as file storages, block storages, or object storages.

In an example embodiment, the network 3300 may be a storage-only network such as a storage area network (SAN). For example, the SAN may be an FC-SAN that uses an FC network and is implemented in accordance with an FC protocol (FCP). For another example, the SAN may be an IP-SAN that uses a TCP/IP network and is implemented in accordance with an SCSI over TCP/IP or Internet SCSI (iSCSI) protocol. In another example embodiment, the network 3300 may be a general network such as a TCP/IP network. For example, the network 3300 may be implemented in accordance with protocols such as FC over Ethernet (FCoE), Network Attached Storage (NAS) and NVMe over Fabrics (NVMe-oF).

Hereinafter, the description will be based on the application server 3100_1 and the storage server 3200_1. The description of the application server 3100_1 may be applied to other application server 3100_n, and the description of the storage server 3200_1 may be applied to other storage server 3200_m.

The application server 3100_1 may store data requested by a user or a client in one of the storage servers 3200_1 to 3200_m through the network 3300. Also, the application server 3100_1 may acquire the data requested by the user or the client from one of the storage servers 3200_1 to 3200_m through the network 3300. For example, the application server 3100_1 may be implemented as a web server or a database management system (DBMS).

The application server 3100_1 may access a memory 3120_n or a storage device 3150_n, which is included in other application server 3100_n, through the network 3300. Alternatively, the application server 3100_1 may access memories 3220_1 to 3220_m or storage devices 3250_1 to 3250_m, which are included in the storage servers 3200_1 to 3200_m, through the network 3300. Therefore, the first application server 3100_1 may perform various operations for the data stored in the application servers 3100_1 to 3100_n and/or the storage servers 3200_1 to 3200_m. For example, the application server 3100_1 may execute command languages for moving or copying data between the application servers 3100_1 to 3100_n and/or the storage servers 3200_1 to 3200_m. In this case, the data may be moved from the storage devices 3250_1 to 3250_m of the storage servers 3200_1 to 3200_m to the memories 3220_1 to 3220_m of the storage servers 3200_1 to 3200_m, or may be directly moved to the memories 3120_1 to 3120_n of the application servers 3100_1 to 3100_n. The data moved through the network 3300 may be data encrypted for security or privacy.

Although not shown, the storage devices 3250_1 to 3250_m may include the master controller 200 described with reference to FIGS. 1 to 8.

The storage server 3200_1 will be described by way of example. The interface 3254_1 may provide physical connection of the processor 3210_1 and the controller 3251_1 and physical connection of the Network InterConnect (NIC) 3240_1 and the controller 3251_1. For example, the interface 3254_1 may be implemented in a Direct Attached Storage (DAS) scheme that directly connects the storage device 3250_1 to a dedicated cable. Also, e.g., the interface 3254_1 may be implemented in a variety of interface ways such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS), and/or Compact Flash (CF) card interface.

The storage server 3200_1 may further include a switch 3230_1 and an NIC 3240_1. The switch 3230_1 may selectively connect the processor 3210_1 with the storage device 3250_1 in accordance with the control of the processor 3210_1, or may selectively connect the NIC 3240_1 with the storage device 3250_1.

In an example embodiment, the NIC 3240_1 may include a network interface card, a network adapter, and the like. The NIC 3240_1 may be connected to the network 3300 by a wired interface, a wireless interface, a Bluetooth interface, an optical interface, and the like. The NIC 3240_1 may include an internal memory, a Digital Signal Processor (DSP), a host bus interface, and the like, and may be connected to the processor 3210_1 and/or the switch 3230_1 through a host bus interface. The host bus interface may be implemented as one of the above-described examples of the interface 3254_1. In an example embodiment, the NIC 3240_1 may be integrated with at least one of the processor 3210_1, the switch 3230_1 and the storage device 3250_1.

In the storage servers 3200_1 to 3200_m or the application servers 3100_1 to 3100_n, the processor may transmit a command to the storage devices 3150_1 to 3150_n and 3250_1 to 3250_m or the memories 3120_1 to 3120_n and 3220_1 to 3220_m to program or read data. At this time, the data may be error-corrected data through an Error Correction Code (ECC) engine. The data may be Data Bus Inversion (DBI) or Data Masking (DM) processed data, and may include Cyclic Redundancy Code (CRC) information. The data may be data encrypted for security or privacy.

The storage devices 3150_1 to 3150_n and 3250_1 to 3250_m may transmit a control signal and a command/address signal to NAND flash memory devices 3252_1 to 3252_m in response to a read command received from the processor. Therefore, when reading data from the NAND flash memory devices 3252_1 to 3252_m, a Read Enable (RE) signal may be input as a data output control signal to output the data to a DQ bus. A data strobe DQS may be generated using the RE signal. The command and the address signal may be latched into a page buffer in accordance with a rising edge or a falling edge of a write enable (WE) signal.

The controller 3251_1 may generally control the operation of the storage device 3250_1. In an example embodiment, the controller 3251_1 may include a Static Random Access Memory (SRAM). The controller 3251_1 may write data in the NAND flash memory device 3252_1 in response to a write command, or read data from the NAND flash memory device 3252_1 in response to a read command. For example, the write command and/or the read command may be provided from the processor 3210_1 in the storage server 3200_1, the processor 3210_m in the other storage server 3200_m or the processors 3110_1 and 3110_n in the application servers 3100_1 and 3100_n. The DRAM 3253_1 may temporarily store (buffer) data to be written in the NAND flash memory device 3252_1 or data read from the NAND flash memory device 3252_1. Also, the DRAM 3253_1 may store metadata. In this case, the metadata is user data or data generated by the controller 3251_1 to manage the NAND flash memory device 3252_1. The storage device 3250_1 may include a Secure Element (SE) for security or privacy.

By way of summation and review, trusted computing technology is a technology that imposes reliability on computers to operate as originally intended, allows hardware-based security chips, such as Trusted Platform Module (TPM), to be commonly applied to all computing power devices, and provides related software as an open standard. The trusted computing technology may be widely used for platforms where computer authentication, network, printing, mobile phones, and application program security, etc. are used. When a verifier (e.g., host) who is granted security approaches a platform (e.g., storage device) including a plurality of devices (e.g., a plurality of firmware), security attestation for a plurality of devices in the platform may be performed. In response to the verifier's security attestation request, the platform may transmit authentication values for the plurality of devices therein, and in this case, integrity for the authentication values transmitted from the platform to the verifier is important.

As described above, embodiments may provide a trusted computing device that helps to ensure integrity for authentication values used for security attestation. Embodiments may provide an operating method of a trusted computing device that helps to ensure integrity for authentication values used for security attestation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A trusted computing device, comprising:
a device driven by firmware; and
a master controller, which generates an authentication value from the firmware and checks integrity for the authentication value at a first period,
wherein the master controller includes:
an authentication value generator, which generates the authentication value;

an authentication value repository, which stores the authentication value;
a security core, which blocks access to the authentication value stored in the authentication value repository from another core of the master controller or from a source outside the master controller to block modulation for the authentication values; and
an integrity checker, which checks integrity for the authentication value stored in the authentication value repository.

2. The trusted computing device as claimed in claim 1, wherein the authentication value generator generates the authentication value by applying a hash function to the firmware.

3. The trusted computing device as claimed in claim 1, wherein the authentication value repository includes a register storing the authentication value.

4. The trusted computing device as claimed in claim 1, wherein the first period is a real time period.

5. The trusted computing device as claimed in claim 1, wherein:
the integrity checker includes:
a virgin tag generator, which generates a virgin tag for the authentication value when the authentication value generator generates the authentication value;
a compare tag generator, which generates a compare tag for the authentication value every first period; and
a comparator, which compares the virgin tag with the compare tag, and
the comparator allows integrity for the authentication value to be maintained when the virgin tag and the compare tag are the same as each other.

6. The trusted computing device as claimed in claim 5, wherein the virgin tag generator generates the virgin tag through an HMAC, a hash function, cyclic redundancy checking (CRC), or a parity bit.

7. The trusted computing device as claimed in claim 5, wherein the master controller further includes an attack detector that includes:
a reset module, which resets the authentication value when a signal indicating that integrity for the authentication value is not maintained is received from the integrity checker as the virgin tag and the compare tag are different from each other; and
an alert module, which informs the security core that integrity for the authentication value is not maintained.

8. A trusted computing device, comprising:
a first device, which is driven by first firmware;
a second device, which is driven by second firmware; and
a master controller, which generates a first authentication value from the first firmware to check integrity for the first authentication value at a first period, and generates a second authentication value from the second firmware to check integrity for the second authentication value at a second period,
wherein the master controller includes:
an authentication value generator, which generates the first authentication value and the second authentication value;
an authentication value repository, which stores the first authentication value and the second authentication value;
a security core, which blocks access to the first and second authentication values stored in the authentication value repository from another core of the master controller or from a source outside the master controller to block modulation for the authentication values; and
an integrity checker, which checks integrity for the first and second authentication values stored in the authentication value repository.

9. The trusted computing device as claimed in claim 8, wherein the first period and the second period are the same as each other.

10. The trusted computing device as claimed in claim 9, wherein each of the first period and the second period is a real time period.

11. The trusted computing device as claimed in claim 8, wherein the authentication value repository includes:
a first register, which stores the first authentication value; and
a second register, which stores the second authentication value.

12. The trusted computing device as claimed in claim 11, wherein the first register and the second register are the same as each other.

13. The trusted computing device as claimed in claim 8, wherein the authentication value generator generates the first authentication value by applying a hash function to the first firmware, and generates the second authentication value by applying the hash function to the second firmware.

14. The trusted computing device as claimed in claim 8, wherein:
the integrity checker includes:
a virgin tag generator, which generates a first virgin tag for the first authentication value when the authentication value generator generates the first authentication value, and generates a second virgin tag for the second authentication value when the authentication value generator generates the second authentication value;
a compare tag generator, which generates a first compare tag for the first authentication value every first period, and generates a second compare tag for the second authentication value every second period; and
a comparator, which compares the first virgin tag with the first compare tag, and compares the second virgin tag with the second compare tag, and
the comparator allows integrity for the first authentication value to be maintained when the first virgin tag and the first compare tag are the same as each other, and allows integrity for the second authentication value to be maintained when the second virgin tag and the second compare tag are the same as each other.

15. The trusted computing device as claimed in claim 14, wherein the virgin tag generator generates the first virgin tag and the second virgin tag through an HMAC, a hash function, cyclic redundancy checking (CRC), or a parity bit.

16. The trusted computing device as claimed in claim 14, wherein the master controller further includes an attack detector that includes:
a reset module, which resets the first authentication value when a signal indicating that integrity for the first authentication value is not maintained is received from the integrity checker as the first virgin tag and the first compare tag are different from each other; and
an alert module, which informs the security core that integrity for the first authentication value is not maintained.

17. The trusted computing device as claimed in claim 16, wherein:
the reset module resets the second authentication value when a signal indicating that integrity for the second authentication value is not maintained is received from the integrity checker as the second virgin tag and the second compare tag are different from each other, and the alert module informs the security core that integrity for the first authentication value is not maintained.

18. A trusted computing device, comprising:
a master controller that checks integrity for an authentication value of firmware that drives a device, wherein:
the master controller checks integrity for the authentication value every first period,
the master controller generates the authentication value through an authentication value generator,
the master controller stores the authentication value through an authentication value repository,
the master controller, through a security core of the master controller, blocks access to the authentication value stored in the authentication value repository from another core of the master controller or from a source outside the master controller to block modulation for the authentication values, and
the master controller checks integrity for the authentication value stored in the authentication value repository, through an integrity checker.

19. The trusted computing device as claimed in claim 18, wherein:
the integrity checker generates a virgin tag for the authentication value through a virgin tag generator when the authentication value generator generates the authentication value,
the integrity checker generates a compare tag for the authentication value through a compare tag generator every first period,
the integrity checker compares the virgin tag with the compare tag through a comparator, and
the integrity checker allows integrity for the authentication value to be maintained through the comparator when the virgin tag and the compare tag are the same as each other.

20. The trusted computing device as claimed in claim 19, wherein the master controller resets the authentication value through a reset module in an attack detector when a signal indicating that integrity for the authentication value is not maintained is received from the integrity checker as the virgin tag and the compare tag are different from each other, and informs the security core that integrity for the authentication value is not maintained, through an alert module in the attack detector.

* * * * *